(12) United States Patent
Lim et al.

(10) Patent No.: US 9,594,593 B2
(45) Date of Patent: Mar. 14, 2017

(54) APPLICATION EXECUTION BASED ON ASSIGNED GROUP PRIORITY AND PRIORITY OF TASKS GROUPS OF THE APPLICATION

(71) Applicant: Samsung Electronics Co., Ltd., Gyeonggi-do (KR)

(72) Inventors: Guensik Lim, Gyeonggi-do (KR); Sangbum Suh, Seoul (KR); Hyunjin Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/878,661

(22) Filed: Oct. 8, 2015

(65) Prior Publication Data

US 2016/0026503 A1    Jan. 28, 2016

Related U.S. Application Data

(63) Continuation of application No. 13/469,648, filed on May 11, 2012, now Pat. No. 9,183,047.

(30) Foreign Application Priority Data

Oct. 11, 2011 (KR) ........................ 10-2011-0103358

(51) Int. Cl.
 *G06F 9/50* (2006.01)
 *G06F 9/48* (2006.01)
 (Continued)

(52) U.S. Cl.
 CPC .......... *G06F 9/5038* (2013.01); *G06F 9/4881* (2013.01); *G06F 9/44* (2013.01);
 (Continued)

(58) Field of Classification Search
 CPC ........ G06F 9/5028; G06F 9/4881; G06F 9/46; G06F 9/44; G06F 9/48; G06F 9/5005
 See application file for complete search history.

(56) References Cited

U.S. PATENT DOCUMENTS 5,058,033 A    10/1991  Bonissone et al.
5,428,789 A    6/1995   Waldron, III
(Continued)

FOREIGN PATENT DOCUMENTS

JP    2010165209    7/2010

OTHER PUBLICATIONS

Anonymous: "Scheduling (computing)", XP055267366, Wikipedia, May 12, 2011, 9 pages.

(Continued)

*Primary Examiner* — Benjamin Wu
(74) *Attorney, Agent, or Firm* — The Farrell Law Firm, P.C.

(57) ABSTRACT

A method and apparatus for improving application processing speed in a digital device which improve application processing speed for a digital device running in an embedded environment where processor performance may not be sufficiently powerful by detecting an execution request for an application, identifying a group to which the requested application belongs, among preset groups with different priorities and scheduling the requested application according to the priority assigned to the identified group, and executing the requested application based on the scheduling result.

18 Claims, 6 Drawing Sheets

Related U.S. Application Data

(60) Provisional application No. 61/485,873, filed on May 13, 2011, provisional application No. 61/485,865, filed on May 13, 2011.

(51) Int. Cl.
 *G06F 9/46* (2006.01)
 *G06F 9/44* (2006.01)

(52) U.S. Cl.
 CPC .............. *G06F 9/46* (2013.01); *G06F 9/48* (2013.01); *G06F 9/5005* (2013.01)

(56) References Cited

U.S. PATENT DOCUMENTS

| | | | |
|---|---|---|---|
| 6,263,359 B1 | 7/2001 | Fong et al. | |
| 6,668,269 B1* | 12/2003 | Kamada | G06F 9/4881 718/102 |
| 6,757,897 B1 | 6/2004 | Shi et al. | |
| 6,834,386 B1* | 12/2004 | Douceur | G06F 9/4881 718/102 |
| 7,058,949 B1 | 6/2006 | Willen et al. | |
| 7,451,447 B1 | 11/2008 | Deshpande | |
| 7,707,578 B1 | 4/2010 | Zedlewski et al. | |
| 7,752,622 B1 | 7/2010 | Markov | |
| 8,239,864 B2* | 8/2012 | Imai | G06F 9/485 455/418 |
| 8,438,572 B2 | 5/2013 | Fecioru | |
| 9,411,640 B2* | 8/2016 | Park | G06F 9/485 |
| 2003/0037091 A1 | 2/2003 | Nishimura et al. | |
| 2003/0236815 A1 | 12/2003 | Brenner et al. | |
| 2004/0015971 A1 | 1/2004 | Spoltore et al. | |
| 2004/0088704 A1 | 5/2004 | Owen et al. | |
| 2004/0255179 A1* | 12/2004 | Mayer | G06F 9/4406 714/1 |
| 2005/0108717 A1 | 5/2005 | Hong et al. | |
| 2006/0123420 A1 | 6/2006 | Nishikawa | |
| 2006/0190482 A1 | 8/2006 | Kishan et al. | |
| 2007/0079021 A1* | 4/2007 | Dees | G06F 9/4443 710/40 |
| 2007/0083871 A1 | 4/2007 | McKenney | |
| 2007/0118838 A1 | 5/2007 | Tsujino et al. | |
| 2007/0198768 A1 | 8/2007 | Kim et al. | |
| 2007/0300230 A1 | 12/2007 | Barsness et al. | |
| 2008/0133608 A1 | 6/2008 | Brown et al. | |
| 2008/0235697 A1 | 9/2008 | Kobayashi | |
| 2009/0172686 A1 | 7/2009 | Chen et al. | |
| 2010/0017447 A1* | 1/2010 | Jones | G06F 12/0269 707/E17.002 |
| 2010/0271725 A1 | 10/2010 | Kim | |
| 2012/0023500 A1 | 1/2012 | Karstens | |
| 2012/0047509 A1* | 2/2012 | Ben-Itzhak | G06F 9/50 718/103 |
| 2012/0198461 A1 | 8/2012 | Saxe et al. | |
| 2012/0311592 A1 | 12/2012 | Kim | |
| 2014/0019873 A1* | 1/2014 | Gupta | H04L 67/36 715/744 |

OTHER PUBLICATIONS

European Search Report dated May 9, 2016 issued in counterpart application No. 12785647.4-1957, 7 pages.

\* cited by examiner

APPLICATION EXECUTION BASED ON ASSIGNED GROUP PRIORITY AND PRIORITY OF TASKS GROUPS OF THE APPLICATION

PRIORITY

This application is a Continuation Application of U.S. patent application Ser. No. 13/469,648, which was filed in the U.S. Patent and Trademark Office on May 11, 2012 and claims priority under 35 U.S.C. §119(e) to U.S. Provisional Applications filed on May 13, 2011 in the United States Patent and Trademark Office and assigned Ser. Nos. 61/485,873 and 61/485,865, and under 35 U.S.C. §119(a) to a Korean patent application filed on Oct. 11, 2011 in the Korean Intellectual Property Office and assigned Serial No. 10-2011-0103358, the entire disclosures of each of which are incorporated herein by reference.

BACKGROUND OF THE INVENTION

1. Field of the Invention

The present invention relates generally to improvement of application processing speed and, more particularly, to a method and apparatus that can improve application processing speed for a digital device running in an embedded environment where processor performance may be not sufficiently powerful.

2. Description of the Related Art

Due to advances in processor and memory technologies, modern digital devices are capable of executing various applications in addition to applications initially installed by manufacturers. Such a digital device may execute multiple applications at the same time.

In a typical digital device, when multiple applications are simultaneously executed, the processor is allocated to the multiple applications in the same proportion. Hence, in a state in which multiple applications are executed, when the user makes an execution request for an additional application, it may take a long time to execute the additional application because the digital device is unable to sufficiently allocate the processor resources to the additional application. This may cause user dissatisfaction with performance of the digital device.

In a digital device having many installed applications, when multiple applications are executed in the background, processing speed of a user requested application can become slower if the processor is not sufficiently powerful. Hence, it is necessary to develop a means for shortening the application execution time in a digital device operating in an embedded environment lacking physical processing resources.

SUMMARY OF THE INVENTION

Accordingly, the present invention has been made to solve the above mentioned problems and the present invention provides a method and apparatus that can improve application processing speed by shortening latency in application execution for a digital device running in an embedded environment where physical processing resources are not sufficient.

According to an aspect of the present invention, there is provided a method and apparatus for improving application processing speed in a digital device wherein applications are classified into multiple groups according to their importance in terms of processing time and response time and different scheduling priorities are applied to the individual groups.

According to an aspect of the present invention, there is further provided a method and apparatus for improving application processing speed in a digital device wherein priorities of a user requested application and other applications in execution are dynamically adjusted so that the user requested application is executed first with a reduced latency time.

According to an embodiment of the present invention, there is provided a method for improving application processing speed in a digital device, including detecting an execution request for an application; identifying a group to which the requested application belongs, among preset groups with different priorities; and scheduling the requested application according to the priority assigned to the identified group, and executing the requested application based on the scheduling result.

According to another embodiment of the present invention, there is provided a method for improving application processing speed in a digital device, including checking, upon detection of an execution request for a user application, whether other applications are being executed; changing, when other applications are being executed, priorities of the other applications being executed so that the user application is executed first, and performing scheduling according to the changed priorities; and executing the user application and the other applications based on the scheduling result.

According to another embodiment of the present invention, there is provided an apparatus for improving application processing speed in a digital device, including a grouping unit identifying, upon detection of an execution request for an application, a group to which the requested application belongs, among preset groups with different priorities; a scheduler scheduling the requested application according to the priority assigned to the identified group; and a processor executing the requested application based on the scheduling result produced by the scheduler.

According to another embodiment of the present invention, there is provided an apparatus for improving application processing speed in a digital device, including an input unit generating an execution request for a user application; and a control unit controlling a process of checking, upon detection of an execution request for a user application from the input unit, whether other applications are being executed, changing, when other applications are being executed, priorities of the other applications being executed so that the user application is executed first, performing scheduling according to the changed priorities, and executing the user application and the other applications based on the scheduling result.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention are described in detail with reference to the accompanying drawings. The same reference symbols are used throughout the drawings to refer to the same or like parts. Detailed descriptions of well-known functions and structures may be omitted to avoid obscuring the subject matter of the present invention. Various changes and modifications may be made to the embodiments of the present invention without departing from the scope of the invention.

In the following description, a "digital device" refers to a device having embedded system constraints, such as a Personal Digital Assistant (PDA), mobile communication terminal, smartphone, tablet computer, smart TV, camera and the like.

The present invention relates to shortening latency of application execution in an embedded system environment where processor performance is not powerful by giving priority to threads requiring a high percentage of processor time. According to an embodiment, to determine which application is to be scheduled first in a state in which available processor time is insufficient, applications are classified into multiple groups according to their scheduling attributes and properties and different priorities are assigned to the individual groups. According to an embodiment, when the user makes an execution request for a specific application while other applications are being executed, application priorities may be changed so that the user requested application is executed first. For example, execution of the other applications may be stopped and the user requested application is executed first, or priorities of the other applications being executed are lowered, thereby increasing the percentage of processor time allocated to the user requested application.

Figure 1:
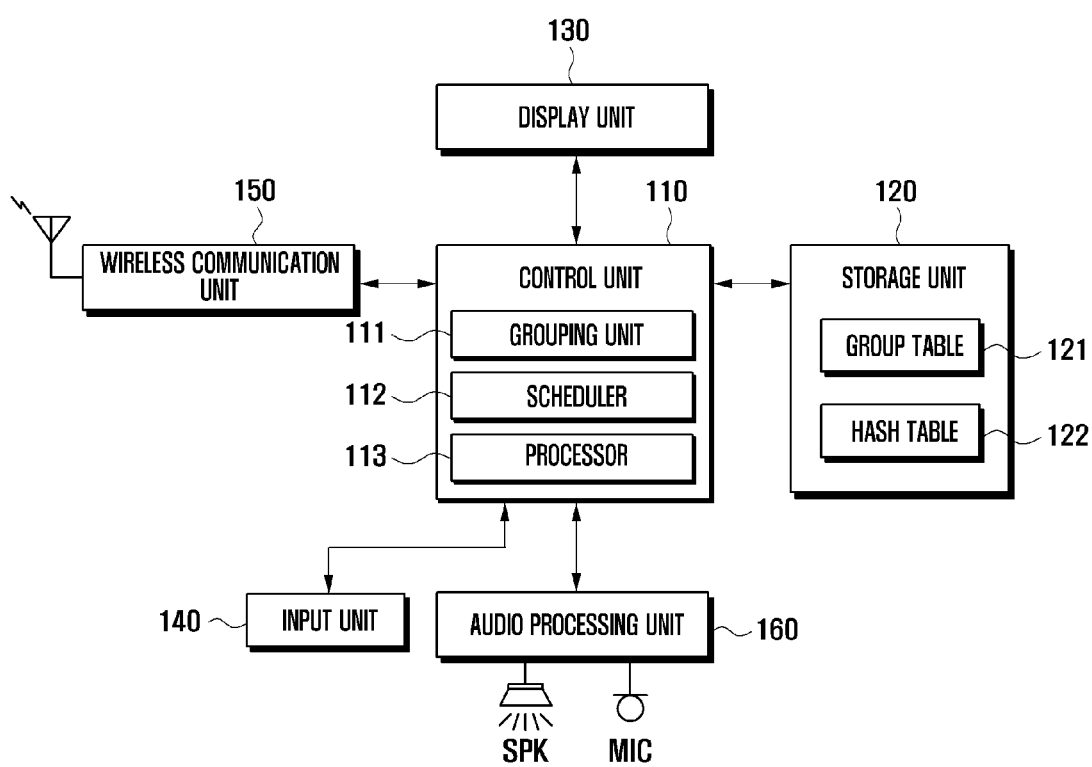
FIG. 1 is a block diagram illustrating a digital device according to an embodiment of the present invention.
Figure 2:
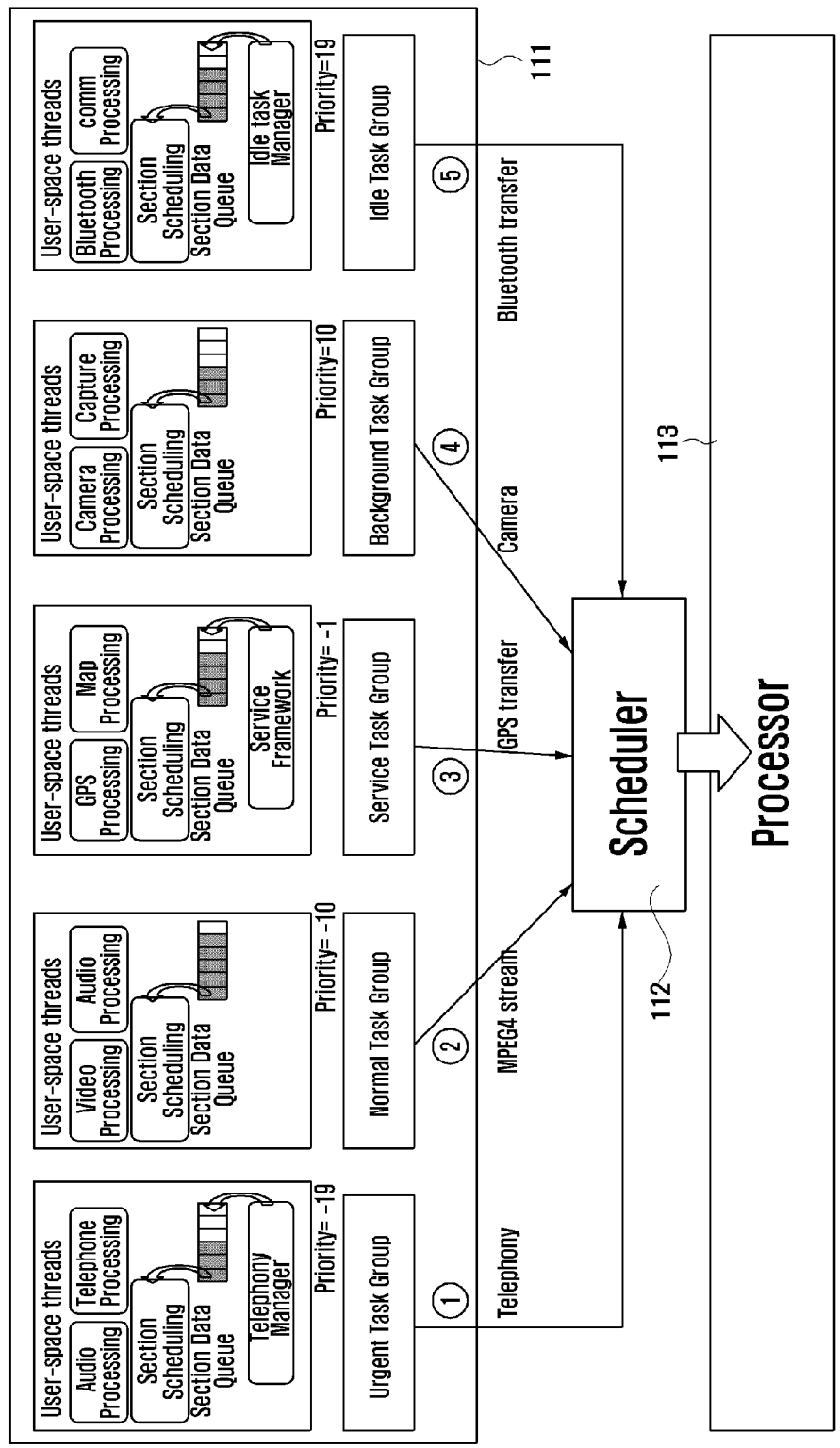
FIG. 2 is a diagram illustrating interactions between internal components of a control unit in the digital device.

FIG. 1 is a block diagram of a digital device 100 according to an embodiment of the present invention, and FIG. 2 illustrates interactions between internal components of a control unit 110 in the digital device 100.

Referring to FIGS. 1 and 2, the digital device 100 includes a control unit 110, a storage unit 120, a display unit 130, an input unit 140, a wireless communication unit 150, and an audio processing unit 160.

The audio processing unit 160 performs encoding and decoding of an audio signal, and may include a codec (coder/decoder) and an audio amplifier. The audio processing unit 160 is connected to a Microphone (MIC) and a Speaker (SPK). The audio processing unit 160 converts an analog voice signal from the microphone into a digital voice signal and forward the digital voice signal to the control unit 110, and converts a digital voice signal from the control unit 110 into an analog voice signal and output the analog voice signal to the speaker. The audio processing unit 160 outputs various audio signals generated by the digital device 100 (audio signals generated by playback of MP3 files and moving image files) to the speaker. The audio processing unit 160 also outputs various audio signals generated by applications being executed.

The wireless communication unit 150 establishes a communication channel with a base station for a voice call, a data call and a video call. Under control of the control unit 110, the wireless communication unit 150 sends and receives a voice signal or a video signal to and from a corresponding terminal.

The wireless communication unit 150 includes a radio frequency transmitter (not shown) for upconverting the frequency of a signal to be transmitted and amplifying the signal, a radio frequency receiver (not shown) for low-noise amplifying a received signal and downconverting the frequency of the received signal, and a duplexer (not shown) for separating a transmit signal from a receive signal. If the digital device 100 does not support wireless communication, the wireless communication unit 150 may be excluded.

The display unit 130 displays various menus of the digital device 100, information input by the user, and information provided to the user. For example, the display unit 130 displays various screens such as an idle screen having multiple application icons, a message handling screen, a menu screen, a message composition screen and a call handling screen. The display unit 130 may be implemented using Liquid Crystal Display (LCD) devices, Organic Light Emitting Diodes (OLED), or Active Matrix Organic Light Emitting Diodes (AMOLED). When the display unit 130 has a touchscreen functionality, it acts as an input means.

The input unit 140 includes a plurality of alphanumeric and function keys for inputting alphanumeric information and for setting various functions of the digital device 100. The input unit 140 sends input signals for requesting and controlling application execution to the control unit 110. The input unit 140 may be implemented using at least one of a keypad of buttons, a ball joystick, an optical joystick, a wheel key, a touch key, a touch pad, a touch screen and a combination thereof.

The storage unit 120 stores programs and user data for realizing functions of the digital device 100. For example, the storage unit 120 stores an Operating System (OS) for booting and operating the digital device 100, and other application programs related to images, sounds and short-range wireless communication to support optional functions of the digital device 100. When the display unit 130 has a touchscreen functionality, the storage unit 120 stores key maps and menu maps for proper display operation. The key maps may correspond to various keyboard layouts including 3 by 4 and Qwerty layouts, and may include a control key map for controlling execution of an application program. The menu maps includes a menu map for controlling execution of an application. The storage unit 120 stores a group table 121 and a hash table 122.

The group table 121 stores classification results of applications according to their importance in terms of processing time and response time. When applications are composed of multiple processes or threads, classification can be made on a process or thread basis. In the present invention, applications are classified into groups of "urgent tasks," "normal tasks," "service tasks," "background tasks" and "idle tasks." In the following description, entries of each group are assumed to be threads for illustration purposes.

An "urgent task" is a thread that is interacting with the user through the topmost screen on the display unit 130 or is currently utilizing the processor 113. A thread in the urgent task group needs immediate processing and may be used to immediately handle user interface activities.

A "normal task" is a thread that is related to the current display operation on the display unit 130 but does not need immediate processing. A thread in the normal task group is maintained in an executable state until termination.

A "service task" is a middleware level thread that supports application functions and utilizes system services. A thread in the service task group may be maintained in an executable state to handle an application related function not directly evident to the user as long as resources of the processor 113 are sufficient to process urgent tasks and normal tasks.

A "background task" is a thread that is invisible to the user. A thread in the background task group does not directly impact a user application. Execution of a background task is terminated when an urgent task, a normal task or a service task makes a usage request for the processor 113. Threads in the background task group may be managed according to the Least Recently Used (LRU) scheme (the most recently used thread is terminated last as it tends to be used again).

An "idle task" is a thread that is unrelated to any component of an activated application. A thread in the idle task group is used to shorten the time to initiate a user requested application. That is, an idle task may act as a cache.

The hash table 122 contains mappings between Thread IDs (TIDs) in the user space and Light Weight Process IDs (LWPIDs) in the kernel space.

The control unit 110 controls the overall operation of the digital device 100 and signal exchange between internal components thereof, and perform data processing operations. The control unit 110 controls a process of identifying, in response to an execution request for an application, a group to which the user requested application belongs, scheduling the application according to the priority assigned to the group, and executing the application based on the determined schedule.

When one or more other applications are being executed when the execution request for the user requested application is made, to process the user requested application first, the control unit 110 changes (lowers) the priorities of the other applications, performs scheduling according to the changed priorities, and controls execution of the user requested application and other applications accordingly. Here, the other applications may have a priority greater than or equal to that of the user requested application. To achieve this, the control unit 110 includes a grouping unit 111, a scheduler 112, and a processor 113.

The grouping unit 111 identifies, in response to an execution request for an application, a group to which the user requested application belongs. When the user requested application is not yet assigned to a group, the grouping unit 111 adds the user requested application to one of the preset task groups according to importance in terms of processing time and response time.

When the scheduling attribute of an application is not set, the application may be assigned to a default group; and when the scheduling attribute of an application is set, the application may be assigned to one of the preset task groups according to a preset rule. When an application is composed of multiple processes or threads, group assignment may be made on a process or thread basis. An application may be assigned to one group when the application is about to be executed, and remain in the group until termination. Group classification or group assignment is described in detail with reference to FIG. 4.

The scheduler 112 adjusts the execution sequence of applications and assigns sequence numbers to executable tasks. The scheduler 112 performs scheduling based on priorities assigned to the groups. That is, the scheduler 112 performs scheduling so that applications with higher priorities can be processed by the processor 113 first.

As illustrated in FIG. 2, when multiple applications are requested for execution, the scheduler 112 performs scheduling so that those applications belonging to a group with a high priority (the urgent task group or the normal task group) can be processed first. In addition, when execution of a user application is requested, the scheduler 112 performs scheduling according to changed priorities of the user application or other applications.

The processor 113 executes applications according to a schedule produced by the scheduler 112. The processor 113 sets the priority of a process or thread constituting an application by means of system calls or library calls illustrated in Table 1.

TABLE 1

| Content | | Function name | Call | Linux Thread | NPTL |
|---|---|---|---|---|---|
| Normal Priority (=Regular) Range: −20~19 | Process Thread | setpriority( ) or nice( ) setpriority( ) or nice( ) | System call System call | getpid( ) | gettid( ) |
| Real-time Priority (=time-critical) Range: 1~99 | Process Thread | sched_setscheduler( ) sched_setparam( ) pthread_setschedparam( ) | System call Library call | | |

Referring to Table 1, the priority of a process or thread being executed may be changed in a "normal priority" range using a system call "setpriority" or "nice"; and the priority of a thread may be changed in a "real-time priority" range using a library call "pthread_setschedparam." Here, "normal priority" is also referred to as "dynamic priority."

Threads having a priority in the "normal priority" range may share the processor 113 in a time-sliced manner, and a thread with a smaller "nice" value (set by the "nice" function) may use the processor 113 for a longer time. The "real-time priority" is used for a thread or process with a real-time constraint. Real-time priorities are not generally used in the user space, and may be used for "watchdog" and "migration" services in the kernel space. Priority change is described in detail below.

Although not illustrated in FIG. 1, the digital device 100 may further include at least one of a camera module for capturing still or moving images, a digital broadcast receiving module for receiving digital broadcasts, a digital music player like an MP3 module and a proximity sensor module for proximity sensing. With the digital convergence trend, it should be apparent to those skilled in the art that the digital device 100 may further include a unit comparable to the above-described units, and one unit thereof may be removed or replaced with another unit.

Figure 3:
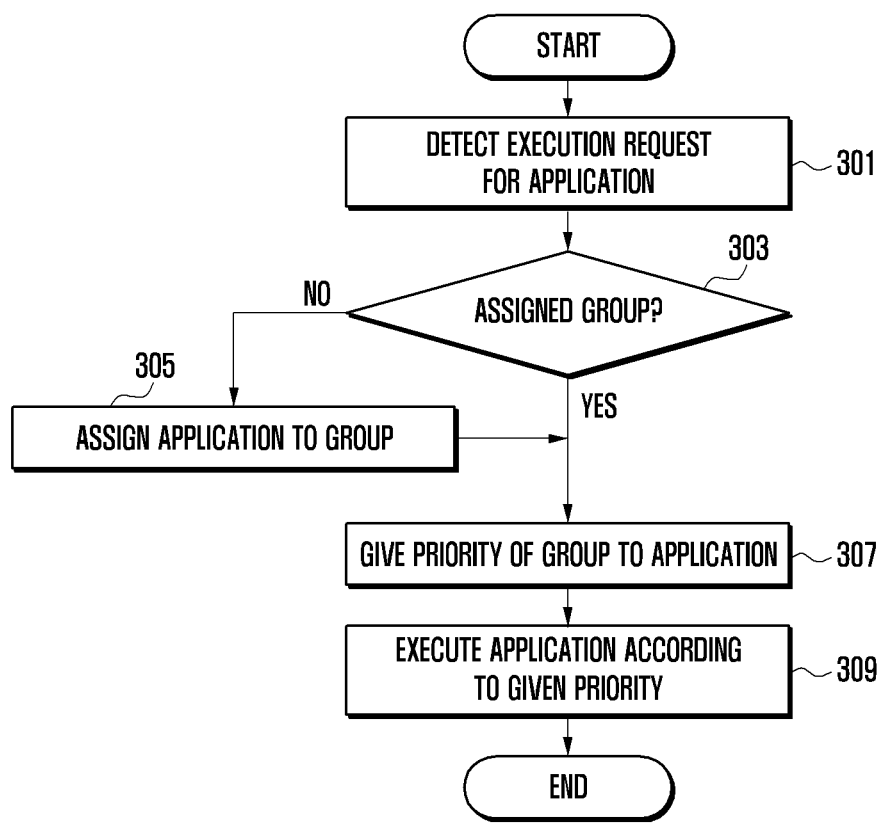
FIG. 3 is a flowchart illustrating a method for improving application processing speed according to another embodiment of the present invention.

FIG. 3 is a flowchart of a method for improving application processing speed in the digital device 100.

Referring to FIG. 3, the control unit 110 of the digital device 100 detects an execution request for an application in Step 301. Upon detection of an execution request for an application, the control unit 110 identifies a group to which the requested application is assigned in Step 303.

When the requested application is not yet assigned to a group, the control unit 110 assigns the requested application to one of the preset task groups in Step 305. Here, the control unit 110 checks the scheduling attribute of the requested application and assigns the requested application to one of the preset task groups according to a preset rule. When the requested application is composed of multiple processes or threads, group assignment may be made on a process or thread basis. This is further described with reference to FIG. 4. After group assignment, the control unit 110 proceeds to step 307.

When the requested application is already assigned to a group, the control unit 110, the control unit 110 assigns the priority of the group to the requested application in Step 307. The control unit 110 performs scheduling of the requested application according to the assigned priority and executes the requested application according to the scheduling results in Step 309. That is, the scheduler 112 performs priority-based scheduling, and the processor 113 executes applications according to the scheduling results.

As described above, according to the present invention, unlike in a method in which multiple applications requested for execution are scheduled to have the same priority, an application requested for execution is assigned to one of the preset groups having different priorities according to the scheduling attribute, is scheduled based on the priority of the assigned group, and is executed according to the scheduling results. That is, an application requiring rapid response time is assigned to a group having a high priority, enabling efficient execution management of the application.

Figure 4:
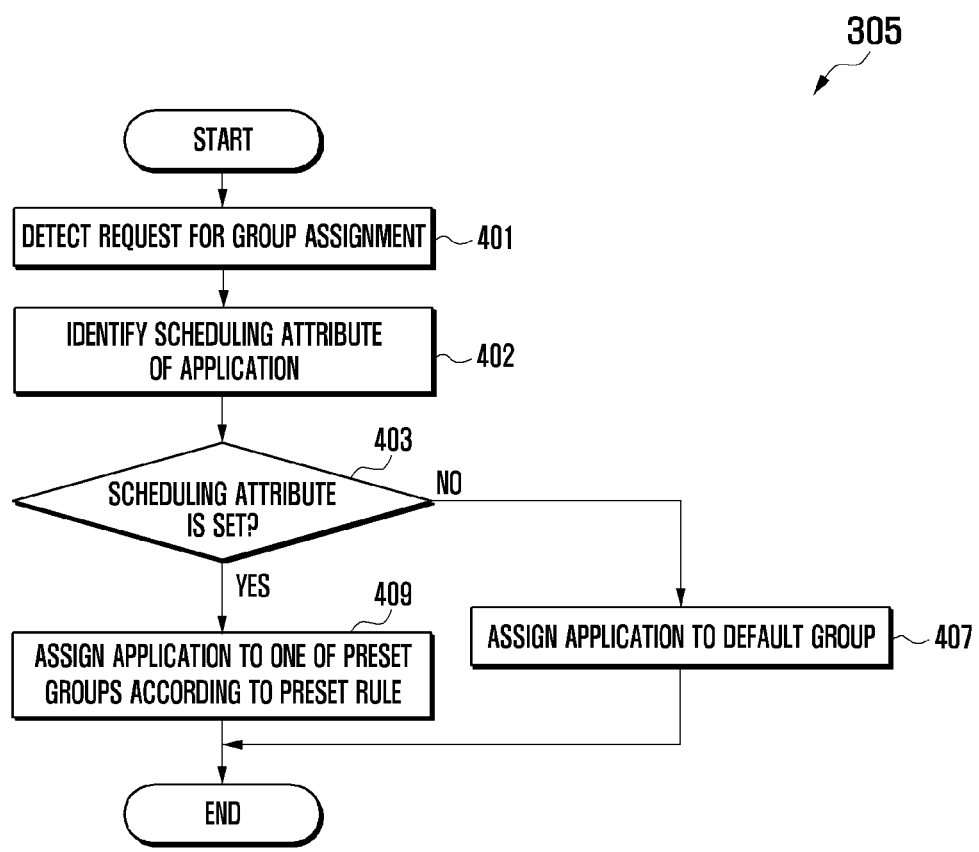
FIG. 4 is a flowchart illustrating a step for application-to-group assignment in the method illustrated in FIG. 3.

FIG. 4 is a detailed flowchart of a step for group assignment in the method illustrated in FIG. 3.

Referring to FIG. 4, the grouping unit 111 of the control unit 110 detects a request for group assignment in Step 401. A request for group assignment may be made when an application is executed for the first time.

The grouping unit 111 identifies the scheduling attribute of the requested application in Step 402, and checks whether the scheduling attribute is set in Step 403. When the scheduling attribute is set, the grouping unit 111 assigns the requested application to one of the preset task groups according to a preset rule in Step 409. Here, the grouping unit 111 may assign the application to a group in consideration of properties thereof such as processing time and response time.

When the scheduling attribute is not set, the grouping unit 111 assigns the application to the default group in Step 407. In the event that the application is composed of multiple processes or threads, group assignment may be made on a process or thread basis.

After group assignment, the application may remain in the assigned group until termination. This is because frequent group reassignment or permanent storage of the reassignment results may be an inefficient use of resources.

Figure 5:
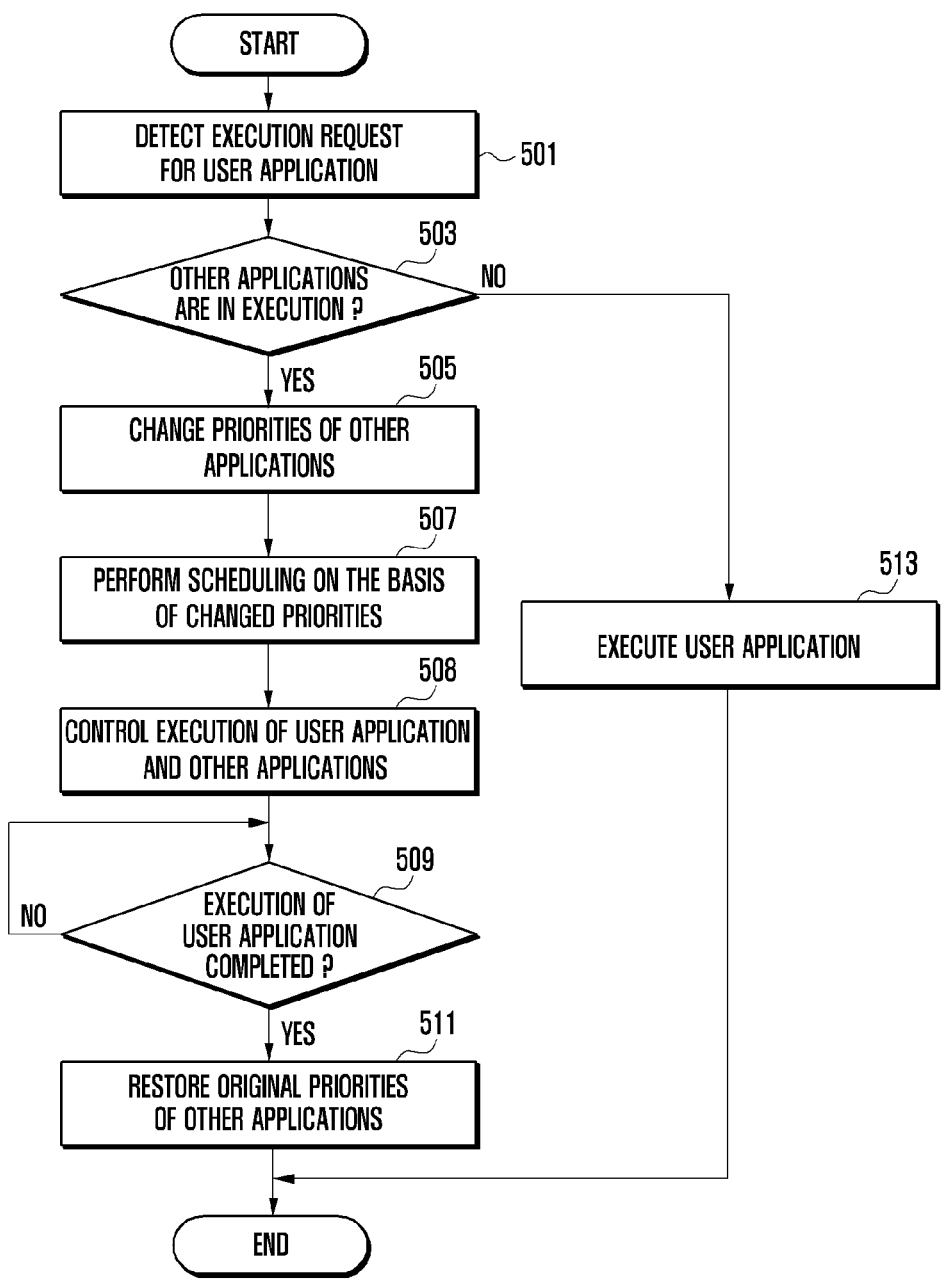
FIG. 5 is a flowchart illustrating a method for improving application processing speed according to another embodiment of the present invention.

FIG. 5 is a flowchart of a method for improving application processing speed in the digital device 100.

Referring to FIG. 5, the control unit 110 detects an execution request for a user application in Step 501. Upon detection of an execution request, the control unit 110 checks whether other applications are being executed in Step 503. Here, the user application may be an application that is requested for execution from the user using a graphical user interface on the input unit 140 or the touchscreen (not shown), and the other applications may be applications that are in competition with the user application. The other applications may have a priority greater than or equal to that of the user application.

When no other applications are being executed, the control unit 110 executes the user application in Step 513. When other applications are being executed, the control unit 110 lowers priorities of the other applications being executed in Step 505, and performs scheduling based on changed priorities in Step 507. In the present invention, the "pthread_setschedparam" function in the Native POSIX Thread Library (NPTL), a common library function working in the user space, may be utilized to change priorities. This is further described with reference to FIGS. 6 and 7.

Based on the scheduling results, the control unit 110 controls execution of the user application and the other applications in Step 508. As described above, as priorities of the other applications are lowered, the user application may utilize the processor 113 for a longer time. Hence, the processing speed of the user application can be improved.

The control unit 110 checks whether execution of the user application is completed in Step 509. When execution of the user application is completed, the control unit 110 restores the original priorities of the other applications in Step 511.

In the above description, priorities of the other applications are lowered. Alternatively, the control unit 110 may raise the priority of the user application, or may suspend execution of the other applications until execution of the user application is completed.

When an application has a priority greater than or equal to a preset threshold, the control unit 110 may not change the priority of the application. For example, when an application belongs to the urgent task group (such as an application for handling reception of a call request), the control unit 110 may not lower the priority of the application.

In the method illustrated in FIG. 5, when the user activates a user application, priorities of existing applications being executed are adjusted or the priority of the user application is adjusted so as to shorten processing time of the user application. This is because the user wishes to quickly view results of the activated application.

Figure 6:
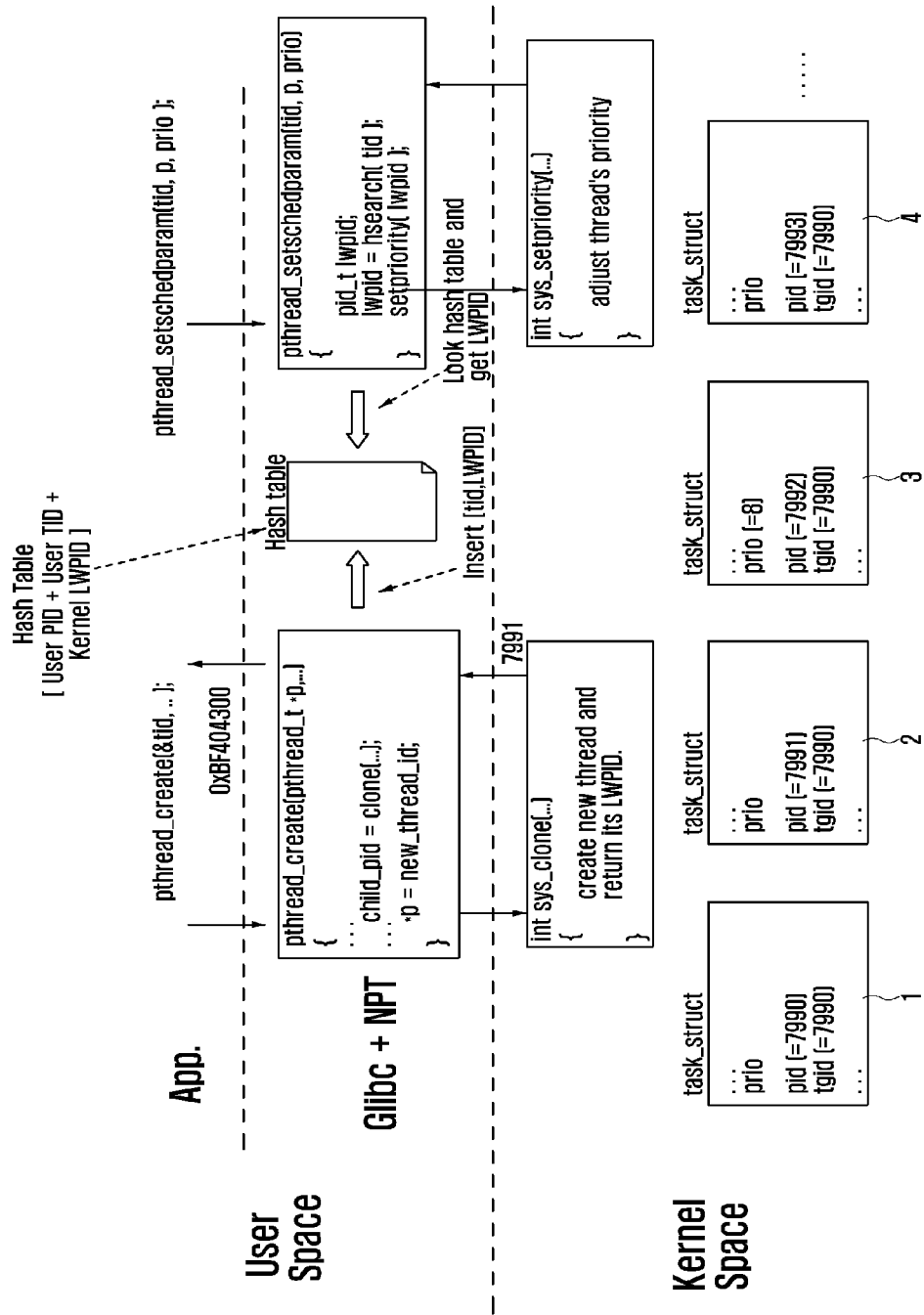
FIG. 6 is a diagram illustrating a scheme for changing priorities of applications.

FIG. 6 illustrates a scheme for changing priorities of applications.

Among many scheduling policies for embedded environments with real-time constraints, while the Round Robin Scheduling Policy (SCHED_RR) is considered ideal, the First-In-First-Out scheduling policy (SCHED_FIFO) is preferred for reasons of efficiency and simplicity.

In the present invention, the pthread_setschedparam function in the NPTL based on Linux Kernel 2.6 is enhanced in a manner conforming to the Portable Operating System Interface (POSIX) standard. To shorten processing time of a user requested application, the enhanced pthread_setschedparam function can be used to adjust the scheduling priority of the user requested application (or scheduling priorities of processes or threads constituting the user requested application) to be adjusted or to change "normal priorities" of other existing applications in runtime. Here, the enhancement should be carried out so that existing threaded applications are reusable without source code modification. In addition, different priorities should be assignable to multiple threads created within one process while compatibility between interfaces of NPTL thread functions and the POSIX standard is maintained.

Table 2 illustrates a pseudo code for an NPTL function that can dynamically adjust the scheduling priority of a "normal priority" thread. However, the present invention is not limited to or by such a pseudo code, and may be implemented in various ways.

TABLE 2

```
int ___pthread_setschedparam(threadid, policy, param)
       pthread_t threadid;
       int policy;
       const struct sched_param *param;
  {
/*To support priority, if used SCHED_FIFO or SCHED_RR, display
caution message
       *(@/usr/include/linux/sched.h)
/*Default Value is normal*/
structp thread *pd = (struct pthread *) threadid;
if (policy == SCHED_OTHER)
{
/*The scheduling priority of the process. */
int which = PRIO_PROCESS;
/*Handling of SCHED_OTHER priority that user assigned */
if (param->sched_priority < -20 && param->sched_priority > 19)
{
         printf("ERROR! Range of priority that you can input is
         -20~19 \r\n");
         return errno;
}
/*Getting LWP(thread id in the kernel) to change priority about assigned
thread id. */
if (setpriority(which, unique_kernel_tid( ), param->sched_priority))
{
         perror ("setpriority( ) is ERROR. It seems that System not
support setpriority( )\n");
         result = errno;
}
}
```

When the pseudo code of Table 2 is implemented, the "pthread_setschedparam" function may be invoked as illustrated FIG. 6. More specifically, after a requested thread is created using the "pthread_create" function, the processor 113 of the control unit 110 refers to the hash table 122 to find a thread ID (LWPID) in the kernel space corresponding to a thread ID (TID) in the user space. Here, the hash table 122 contains information on mappings between thread IDs in the user space and thread IDs in the kernel space.

Thereafter, the processor 113 invokes the "setpriority" function using the found thread ID (LWPID) in the kernel space. Then, the "setpriority" function invokes a system call working in the kernel space to adjust the priority of the thread corresponding to the thread ID (LWPID). After the priority of the corresponding thread is adjusted, the scheduler 112 performs scheduling of the corresponding thread based on the adjusted priority.

In the above description, the "setpriority" function is used for priority change. Alternatively, the "nice" or "renice" function may be used for priority change. Priority change using the "setpriority," "nice" or "renice" function is well known to those skilled in the art, and a detailed description thereof is omitted.

After changing the function related to thread scheduling in the NPTL, different priorities can be assigned to multiple threads created by one process as illustrated in Table 3.

TABLE 3

```
/*
*@Description:voluntary & enforced thread scheduling at
non-preemptive mode
*@thread variables(pthread_t thread[max])
*If you want to affect priority about each thread of the process in the
kernel 2.6 + NPTL,
*We recommend that you use SCHED_OTHER policy based on
priority-based scheduling.
*And, If you need time slice(sharing) about threads, Use SCHED_RR
Policy
*(Real-time Policy) with Same Priority using
pthread_attribute_setschedpolicy( ).
*/
```

TABLE 3-continued

```
struct sched_param schedp;
int priority=5; /* You have to input Priority Number of between -20
and 19. */
memset(&schedp, 0, sizeof(schedp));
schedp.sched_priority=priority;
pthread_setschedparam(pthread_self( ), SCHED_OTHER, &schedp)
//for self thread
pthread_setschedparam(thread[i], SCHED_OTHER, &schedp) //for
other thread
```

Referring to Table 3 and FIG. 6, a brief description is given of changing the priority of a thread with "pid" of "7992" by means of the "renice" function.

After finding a thread ID in the kernel space using the hash table 122, the processor 113 of the control unit 110 issues a priority adjustment command "renice 8-p 7992", which then changes the priority of the thread with "pid" of "7992" to '8'. As described above, the priority of a thread may be dynamically changed by means of the "pid" value of the thread. That is, the priority of a user application or priorities of other applications (or threads) being executed may be dynamically changed so that the user application is processed first. The "tgid" value of a thread indicates a process to which the thread belongs. As illustrated in FIG. 6, multiple threads 2, 3 and 4 are threads constituting a process 1. A thread whose "tgid" value is the same as the "pid" value may be a process.

According to the present invention, the method for improving application processing speed may be implemented as a computer program and may be stored in various computer readable storage media. The computer readable storage media may store program instructions, data files, data structures and combinations thereof. The program instructions may include customized instructions and existing general-purpose instructions. The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters.

According to an aspect of the present invention, there are provided a method and apparatus for improving application processing speed in a digital device. Applications are classified into multiple groups according to their importance in terms of processing time and response time, and different scheduling priorities are applied to the individual groups. Hence, the processor can be utilized in a more efficient way. In other words, the processor is utilized more by an application belonging to a group of a high priority and is utilized less by an application belonging to a group of a low priority, so that the application belonging to the high-priority group is processed first. This can be used to increase processing speed of an application directly related to the user.

In addition, when the user makes an execution request for a specific application, the priority of the user requested application may be raised or priorities of other applications being executed are lowered so that the user requested application is processed first with a reduced latency time. Hence, processing speed of the user requested application can be increased.

Although various embodiments of the present invention for increasing application processing speed in a digital device have been described in detail herein, many variations and modifications may be made without departing from the spirit and scope of the present invention, as defined by the appended claims.

What is claimed is:

1. An electronic device, comprising:
   a display unit; and
   a processor configured to:
   detect a request for executing an application;
   identify a group of the requested application, wherein a group of an application comprises a first group set to process an application which is displayed on the display unit and a second group, having a lower priority than the first group, set to process an application which is not displayed on the display unit; and
   execute the requested application based on a priority assigned to the group of the requested application,
   wherein the first group comprises:
   an urgent task group processing an application that interacts with a user via the display unit and applications currently utilizing the processor, and
   a normal task group processing an application that is maintained in an executable state until termination.

2. The electronic device of claim 1, wherein an application of the first group comprises a foreground application, and an application of the second group comprises a background application.

3. The electronic device of claim 1, wherein the requested application comprises at least one thread, and wherein a thread of the first group is associated with a function of an application which is displayed on the display unit and a thread of the second group is associated with a function of an application which is not displayed on the display unit.

4. The electronic device of claim 3, wherein the processor is further configured to identify whether a group of each thread of the requested application is one of the first group and the second group.

5. The electronic device of claim 4, wherein the processor is further configured to execute each thread of the requested application based on a priority assigned to the group of each thread of the requested application.

6. The electronic device of claim 1, wherein the processor is further configured to:
   execute an application of the first group; and
   execute an application of the second group, having lower priority than the first group, after the application of the first group is executed.

7. The electronic device of claim 1, wherein the second group comprises:
   a background task group corresponding to an application that is terminated when an application corresponding to an urgent task group, a normal task group, and a service task group requests usage of the processor; and
   an idle task group corresponding to an application that is used to shorten a time to rerun an application in waiting.

8. The electronic device of claim 1, wherein the group of the application further comprises a third group set to process an application supporting an application of the first group, wherein the third group comprises a service task group corresponding to an application that is maintained providing that there are sufficient resources available to process applications in an urgent task group and a normal task group.

9. The electronic device of claim 8, wherein a priority of the first group is higher than a priority of the second group, and the priority of the second group is higher than a priority of the third group.

10. A method for processing application in an electronic device, comprising:
    detecting a request for executing an application;
    identifying a group of the requested application, wherein a group of an application comprises a first group set to process an application which is displayed on a display unit of the electronic device and a second group, having lower priority than the first group, set to process an application which is not displayed on the display unit; and
    executing the requested application based on a priority assigned to the group of the requested application,
    wherein the first group comprises:
    an urgent task group processing an application that interacts with a user via the display unit and applications currently utilizing a processor of the electronic device, and
    a normal task group processing an application that is maintained in an executable state until termination.

11. The method of claim 10, wherein an application of the first group comprises a foreground application, and an application of the second group comprises a background application.

12. method of claim 10, wherein the requested application comprises at least one thread, and wherein a thread of the first group is associated with a function of an application which is displayed on the display unit and a thread of the second group is associated with a function of an application which is not displayed on the display unit.

13. The method of claim 12, wherein identifying the group of the requested application comprises identifying whether a group of each thread of the requested application is one of the first group and the second group.

14. The method of claim 13, wherein executing the requested application comprises executing each thread of the requested application based on a priority assigned to the group of each thread of the requested application.

15. The method of claim 10, wherein executing the requested application comprises:
    executing an application of the first group; and
    executing an application of the second group, having lower priority than the first group, after the application of the first group is executed.

16. The method of claim 10, wherein the second group comprises:
    a background task group corresponding to an application that is terminated when an application corresponding to a urgent task group, a normal task group, and a service task group requests usage of the processor; and
    an idle task group corresponding to an application that is used to shorten a time to rerun an application in waiting.

17. The method of claim 10, wherein the group of the application further comprises a third group set to process an application supporting an application of the first group, wherein the third group comprises a service task group corresponding to an application that is maintained as long as sufficient resources are available to process applications in an urgent task group and a normal task group.

18. The method of claim 17, wherein a priority of the first group is higher than a priority of the second group, and the priority of the second group is higher than a priority of the third group.

* * * * *